United States Patent
Lee et al.

(10) Patent No.: US 8,019,136 B2
(45) Date of Patent: Sep. 13, 2011

(54) OPTICAL SECTIONING MICROSCOPY

(75) Inventors: Chau-Hwang Lee, Hsin-Dian (TW); Jiunn-Yuan Lin, Chia-Yi (TW)

(73) Assignee: Academia Sinica, Taipei (TW)

(*) Notice: Subject to any disclaimer, the term of this patent is extended or adjusted under 35 U.S.C. 154(b) by 463 days.

(21) Appl. No.: 12/341,447

(22) Filed: Dec. 22, 2008

(65) Prior Publication Data

US 2010/0135547 A1    Jun. 3, 2010

Related U.S. Application Data

(60) Provisional application No. 61/119,505, filed on Dec. 3, 2008.

(51) Int. Cl.
*G06K 9/00* (2006.01)
(52) U.S. Cl. .......................... 382/128; 382/131
(58) Field of Classification Search .......... 382/128–134; 128/922
See application file for complete search history.

(56) References Cited

U.S. PATENT DOCUMENTS 5,414,623 A * 5/1995 Lu et al. .......................... 382/131
* cited by examiner

*Primary Examiner* — David Mis
(74) *Attorney, Agent, or Firm* — Occhiuti Rohlicek & Tsao LLP

(57) ABSTRACT

Systems and methods for optical sectioning microscopy with structured illumination are provided. A light source generates a light beam with a spatial pattern for successively illuminating a sample at each phase of a plurality of phases. A detector detects a first set of images of the sample at a first axial resolution and a first lateral resolution, each image being associated with a respective phase of the plurality of phases of the illumination. A processor processes the first set of images to generate an enhanced sectioned image of the sample. More specifically, the processor generates data representing a second set of images at a second axial resolution greater than the first axial resolution; and subsequently, performs spectral analysis on the data representing the second set of images to form data representing the enhanced sectioned image of the sample at a second lateral resolution greater than the first lateral resolution.

24 Claims, 11 Drawing Sheets

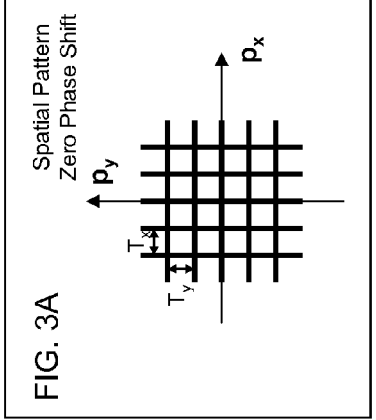
FIG. 3A Spatial Pattern Zero Phase Shift
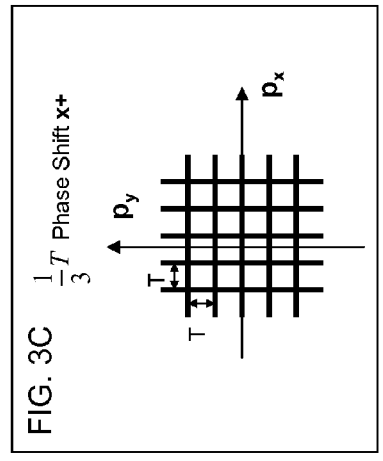
FIG. 3C $\frac{1}{3}T$ Phase Shift x+
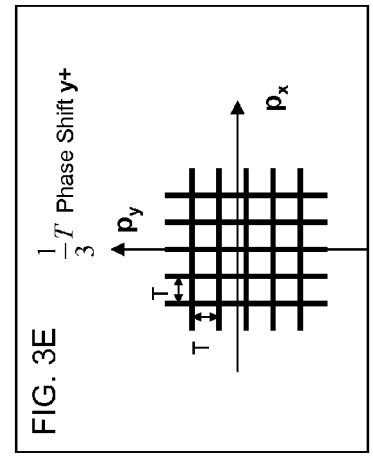
FIG. 3E $\frac{1}{3}T$ Phase Shift y+
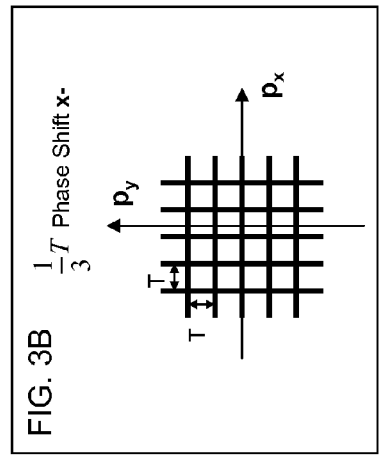
FIG. 3B $\frac{1}{3}T$ Phase Shift x-
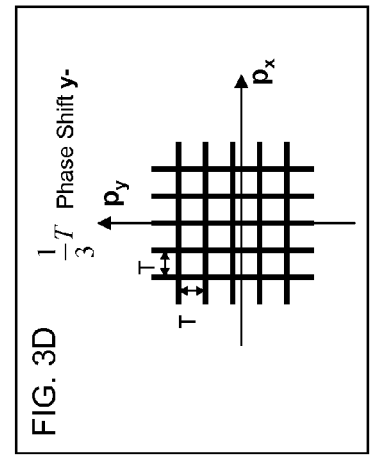
FIG. 3D $\frac{1}{3}T$ Phase Shift y-

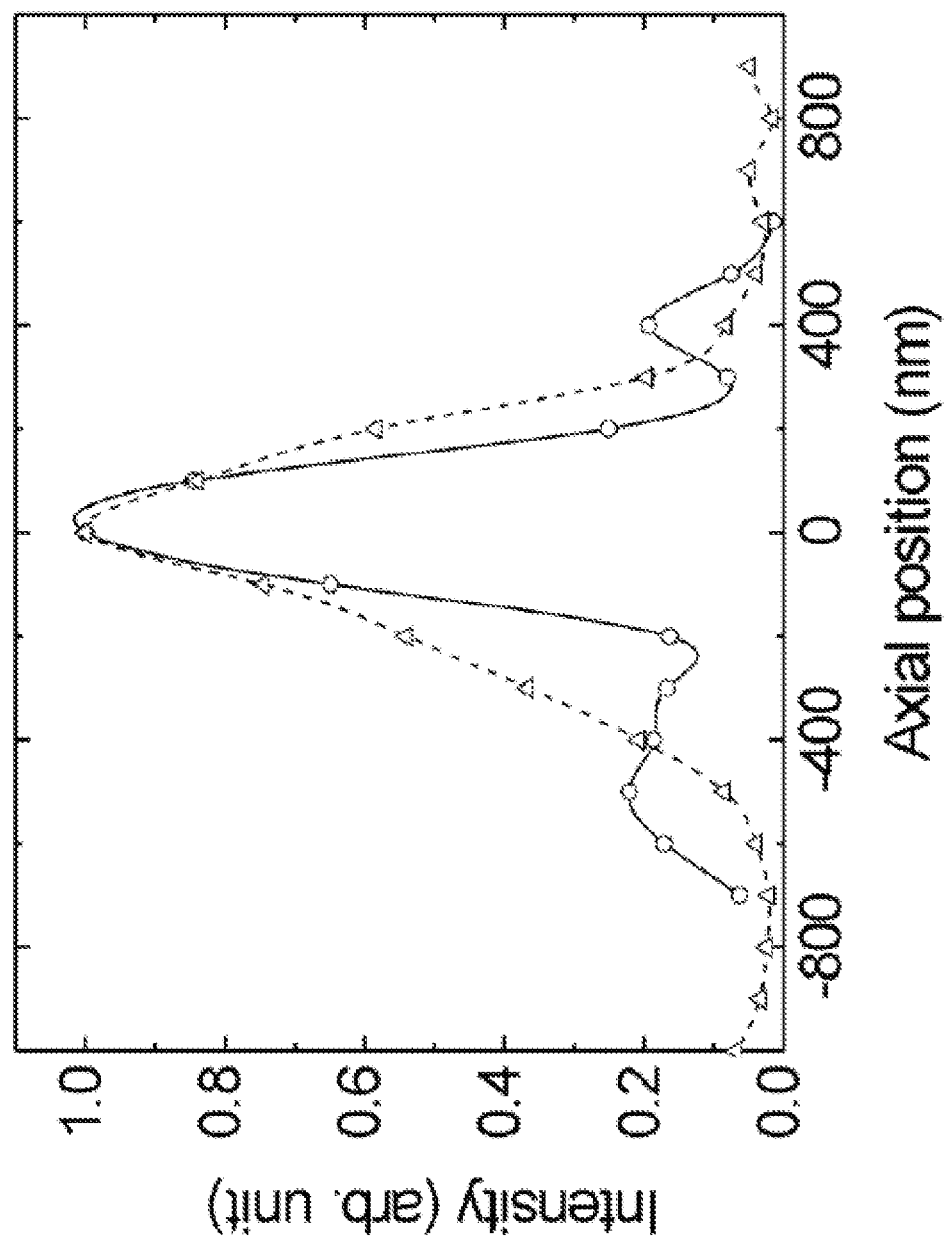
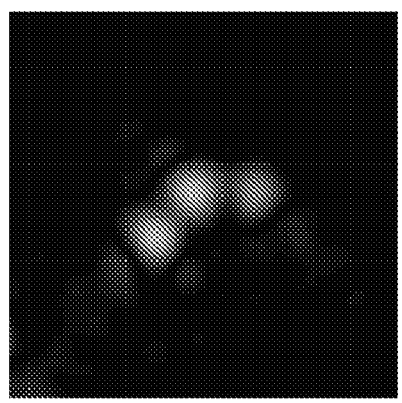
FIG. 6A
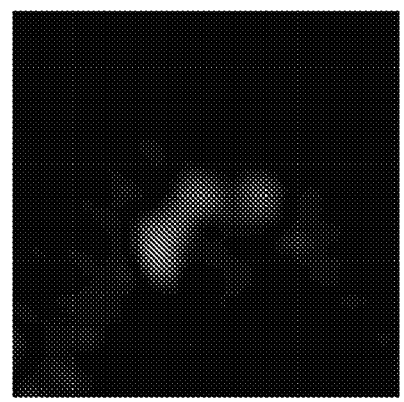
FIG. 6B
FIG. 6C

OPTICAL SECTIONING MICROSCOPY

CROSS-REFERENCE TO RELATED APPLICATION

This application claims the benefit of U.S. Provisional Application 61/119,505, filed Dec. 3, 2008, the content of which is incorporated herein by reference in its entirety.

BACKGROUND

This invention relates to optical sectioning microscopy.

Sectioning microscopy can be performed using structured illumination, which may also be referred to as patterned excitation.

Wide-field optical microscopy is one technique for observing biological specimens. For a traditional wide-field microscope, the resolving power (e.g., the ability of its optical components to distinguish two spatially separate points of a specimen) is constrained by the diffraction limit of light. According to the Rayleigh criterion, two points of a specimen can be resolved if they are separated at least by ~$0.5\lambda$ laterally and ~$\lambda$ in depth ($\lambda$ being the wavelength of the light). This resolution is insufficient for imaging many small objects such as sub-cellular organelles.

In the past decades, various resolution-enhancing techniques have been developed for achieving a sub-diffraction-limit optical resolution (sometimes referred to as "super-resolution") in wide-field microscopes. Despite their success, many of these techniques may not be suited for implementations in ordinary laboratories, for example, due to system complexity and/or high costs. Some computational methods, on the other hand, apply numerically iterative image processing algorithms for resolving high-contrast images (such as fluorescence or topography images). Still, the computation time for processing time-lapse movies can be overly long when dynamic analyses of a specimen are desired.

SUMMARY

One general aspect of the invention relates to a method for optical imaging. The method includes successively illuminating a sample with a spatial pattern at each phase of a plurality of phases; acquiring data representing a first set of images of the sample at a first axial resolution and a first lateral resolution, each image being associated with a respective phase of the plurality of phases of the illumination; and processing the acquired data to generate an enhanced sectioned image of the sample. Processing the acquired data further includes processing the acquired data to generate data representing a second set of images at a second axial resolution greater than the first axial resolution; and performing spectral analysis on the data representing the second set of images to form data representing the enhanced sectioned image of the sample at a second lateral resolution greater than the first lateral resolution.

Embodiments of this method may include one or more of the following features.

The first set of images may be arithmetically combined to generate the second set of images according to the respective phase of the illumination associated with each of the first set of images.

For each image of a subset of the second set of images, Fourier analysis may be performed to form a spectral representation of the image in a spatial-frequency domain. A respective portion of each of the spectral representations may be combined to form a composite spectral representation of the enhanced sectioned image of the sample. The enhanced sectioned image of the sample may be generated by inverse Fourier transform of the composite spectral representation.

In some examples, to combine the respective portion of each of the spectral representations, each of the spectral representations of the subset of the second set of image may be shifted towards an origin of the frequency domain by a vector determined at least based on a physical characteristic of the spatial pattern. The physical characteristic of the spatial pattern may include a periodicity of the pattern.

In some examples, the spatial pattern may exhibit periodicity in one spatial dimension. In other examples, the spatial pattern exhibits spatial periodicity in two or more spatial dimensions.

The sample may be illuminated, for example, by translating the spatial pattern, in a plane perpendicular to an axis of the illumination, in a linear fashion to each of a sequence of positions determined based on a periodicity of the spatial pattern. Alternatively, the sample may be illuminated, rotating the spatial pattern by each of a sequence of angles in a plane perpendicular to an axis of the illumination.

In some examples, the illumination is focused to a first depth of the sample for generating a sectioned image of the sample at the first depth. Moreover, the illumination may be successively focused to a series of depths of the sample for generating a series of sectional images of the sample each at a respective depth.

Another general aspect of the invention relates to a system for optical imaging. A light source generates a light beam with a spatial pattern for successively illuminating a sample at each phase of a plurality of phases. A detector detects a first set of images of the sample at a first axial resolution and a first lateral resolution, each image being associated with a respective phase of the plurality of phases of the illumination. A processor receives and processes the first set of images to generate an enhanced sectioned image of the sample. More specifically, the processor is configured to process the first set of images to generate data representing a second set of images at a second axial resolution greater than the first axial resolution; and perform spectral analysis on the data representing the second set of images to form data representing the enhanced sectioned image of the sample at a second lateral resolution greater than the first lateral resolution.

Embodiments of this system may include one or more of the flowing features.

The system may include an optical component for focusing the light beam at a first depth of the sample.

The system may also include a controller coupled to the optical component and configured to control the optical component for focusing the light beam at a second depth of the sample. The controller may include a piezo-electric positioner.

The light source may include a mask having a first periodicity in a first spatial dimension. In some examples, the mask may further have a second periodicity in a second spatial dimension.

The light source may further include a modulator coupled to the mask and configured for modulating the phase of the illumination by changing a configuration of the mask. The configuration of the mask may include a position of the mask. Alternatively or additionally, the configuration of the mask may include an orientation of the mask.

The processor may be further configured to arithmetically combine the first set of images to generate the second set of images according to the respective phase of the illumination associated with each of the first set of images. For each image of a subset of the second set of images, the processor conducts Fourier analysis to form a spectral representation of the image in a spatial-frequency domain. In addition, the processor combines a respective portion of each of the spectral representations to form a composite spectral representation of the enhanced sectioned image of the sample. The processor then generates the enhanced sectional image by inverse Fourier transform of the composite spectral representation.

The light source may be configured to generate the spatial pattern by itself. For example, the light source may include an LED array configured to generate movable 2D light patterns.

Various embodiments of the system and method described herein can include one or more of the following advantages.

Using a single spatial light modulator to modulate the spatial phase of illumination light, the resolution of a wide-field optical microscope can be improved in three dimensions. When fast-switching electro-optical techniques are used for light modulation, the image acquisition rate can be as high as one super-resolution image (e.g., processed from five patterned image frames) per second.

The system and methods described herein can be easily implemented in various optical setups (including conventional fluorescence microscopes) at a low cost. In addition, more than one excitation light source can be conveniently installed in the system, which may be useful in applications such as studying cellular functions. Further, because super-resolution images of a specimen are obtained at a high speed, dynamic analyses of organelles inside living cells can be performed.

In some examples where only Fast Fourier Transform (FFT) and algebraic computations are needed, image processing can be implemented using a stand-alone processor. Such a processor may process images faster than some alternative software implementations and may be further integrated into an existing personal computer as a PCI card.

Other features and advantages of the invention are apparent from the following description, and from the claims.

BRIEF DESCRIPTION OF DRAWINGS

FIG. 3A-3E are schematic illustrations of modulating an exemplary two-dimensional periodic pattern at a sequence of phases according to the procedure of FIG. 2.

FIGS. 6A and 6B are images of three 200-nm beads recorded at different axial positions using a mesh patter of a 750-nm period.

FIG. 6C is a plot of a first intensity profile (dashed curve) along the optical axis obtained using a mesh pattern of a 750-nm period, and a second intensity profile (solid curve) obtained using a mesh pattern of a 500-nm period.

DETAILED DESCRIPTION

1 System Overview

Figure 1:
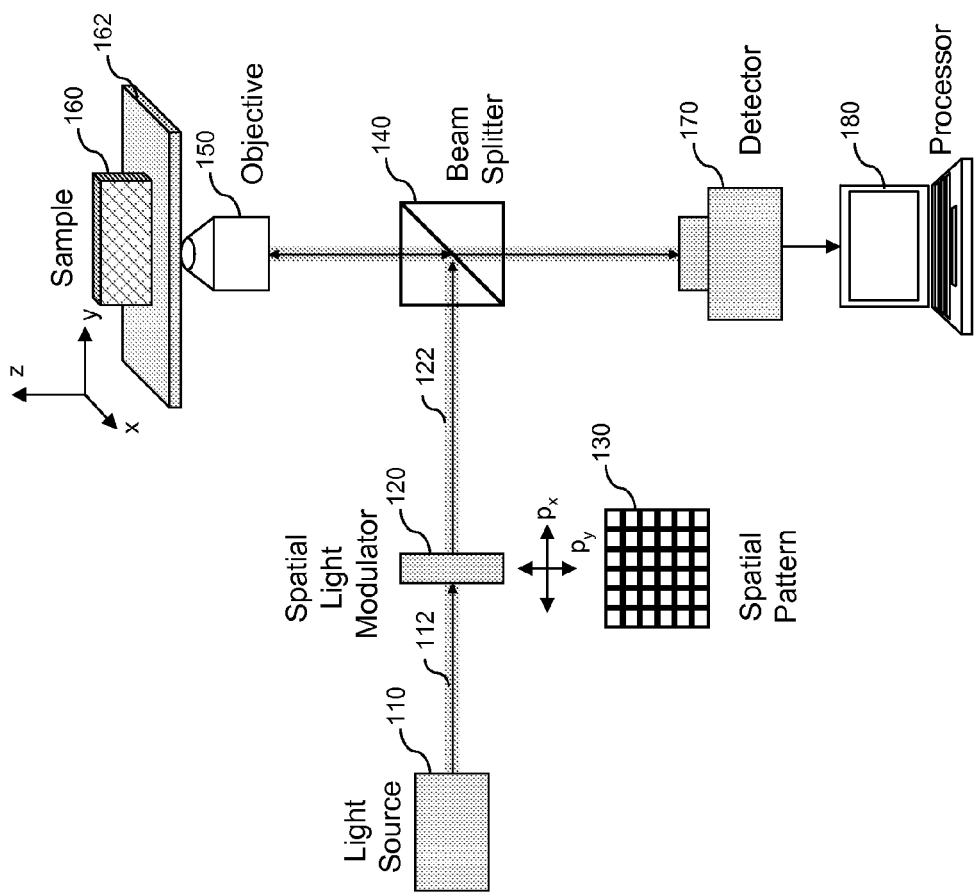
FIG. 1 is a schematic illustration of one embodiment of an optical sectioning microscope with structured illumination.

Referring to FIG. 1, one embodiment of an optical sectioning microscope 100 with structured illumination is provided. The optical sectioning microscope 100 includes several components of a conventional microscope, including, for example, a light source 110 for producing a light beam 112, a beam splitter 140 for reflecting the light beam 112 toward a specimen 160 to be imaged, and a set of optical components including an objective 150 for focusing the light beam 112 onto a selected imaging plane of the specimen 160. Light reflected (or emitted) by the specimen 160 is first received by the objective 150, and after passing through the beam splitter 140, is detected by a detector 170 (e.g., a CCD camera). The detector 170 converts the detected light signals into electrical signals that is be transmitted to a processor 180 (e.g., a computer) to form digital images of the specimen 160.

Here, the specimen 160 (or alternatively, the objective 150) is mounted on a positioning stage 162 to enable linear movement in both lateral and axial directions. In this description, the term "axial" generally describes a direction along an optical axis of light propagation (e.g., the z-axis shown in FIG. 1), whereas the term "lateral" generally describes a direction in a plane (e.g., the x-y-plane) perpendicular to the optical axis. For a "thick" specimen 160 (e.g., an object more than 1 μm in height), sectioned images of the specimen can be formed at various depths by adjusting the z-distance between the specimen 160 and the objective 150. This is sometimes also referred to as the optical sectioning ability of a microscope.

As described briefly in the Background section, the spatial resolution of a conventional wide-field microscope is constrained by the diffraction limit of light. Here, the term "spatial resolution" or "optical resolution" generally describes the ability of the optical components of an imaging system to resolve detail in the specimen being imaged. In other words, "spatial resolution" corresponds to the minimal spatial distance by which two distinguishable (resolvable) points in the specimen are separated. Thus, an imaging system of a "greater" or "enhanced" spatial resolution is able to reveal "finer" structures within the specimen, or is able to distinguish adjacent points that are separated by a smaller spatial distance.

One approach to improving the spatial resolution of a wide-field microscope is to illuminate the specimen with a spatially modulated pattern, which essentially performs a harmonic spatial-frequency mixing process, as described in detail below.

In this embodiment, a spatial light modulator 120 is provided with the light source 110 for projecting a spatial pattern (e.g., a substantially periodic spatial pattern) onto the specimen 160 through a patterned light beam 122. One example of the spatial light modulator 120 includes a mask 130 (e.g., in the form of a two-dimensional grating) and a controller (not shown) for adjusting the spatial configuration of the mask such that the spatial phase of the patterned light beam 122 can be incrementally or continuously changed. The mask 130 may have local periodicity in one or more dimensions (e.g., along $p_x$ and $p_y$ axes in a plane perpendicular to the direction of light beam 112 as shown in FIG. 1). The spatial configuration of the mask 130 may be changed, for example, by spatially shifting the mask 130 in a linear or rotational manner.

Without being limited by any theory presented herein, the resolution-enhancing ability of the microscope 100 with structured illumination may be at least partially understood according to the following.

Assume $I_0$ is the intensity of a uniform illumination at the focal plane of the objective 150, and $M_0$ is the ordinary image of a specimen as a result of the uniform illumination. Now consider the specimen in a spatial-frequency domain (also referred to as reciprocal space) by its Fourier transform. For each optical system, according to its optical transfer function (OTF), only the spatial-frequencies of the specimen below a cut-off frequency threshold are transmitted through the system. Thus the image $M_0$ formed by the optical system contains only optical information emanating from the specimen that resides in the transmitted spatial-frequency band ("passband"). In other words, optical information of the specimen outside this passband is irrecoverably lost in $M_0$.

When a modulated 2D spatial pattern is projected onto the specimen, the intensity $I(x,y)$ of the structured illumination at the focal plane becomes:

$$I(x,y) = I_0[2 + \cos(ux - \Delta\phi_x) + \cos(uy - \Delta\phi_y)] \quad (1)$$

where u is the spatial frequency of the modulated pattern in reciprocal space, and $\Delta\phi_x$ and $\Delta\phi_y$ are the phase constants corresponding to the shift of the modulated pattern relative to the specimen in the x- and y-directions, respectively. The spatial frequency u can be further expressed by:

$$u = (4\pi n)\sin(\alpha)/\lambda \quad (2)$$

where n is the refractive index of glass, $\alpha$ is the angle of a light beam to the optical axis of the optical system, and $\lambda$ is the vacuum wavelength of the illumination.

As a result of the structured illumination, the image $M(x,y)$ of the specimen can now be described as:

$$M(x,y) = 2M_0(x,y) + M_{X-}(x,y)e^{-i\Delta\phi_x} + M_{X+}(x,y)e^{i\Delta\phi_x} + M_{Y-}(x,y)e^{-i\Delta\phi_y} + M_{Y+}(x,y)e^{i\Delta\phi_y} \quad (3)$$

where $M_0$ again is the ordinary image of the specimen under uniform illumination, and $M_{X\pm}(x,y)$ and $M_{Y\pm}(x,y)$ are four image components whose spectrum centers are respectively shifted by the spatial frequency u in reciprocal space along the $k_x$ or $k_y$ axes in positive and negative directions. Here, using (tilde) to denote the two-dimensional Fourier transform of a variable, the frequency spectrum of image $M_0$ is expressed as $\tilde{M}_0$, and the frequency spectra of $M_{X\pm}(x,y)$ and $M_{Y\pm}(x,y)$ are expressed as $\tilde{M}_{X\pm}(k_x \pm u, k_y)$ and $\tilde{M}_{Y\pm}(k_x, k_y \pm u)$, respectively.

One major effect of structured illumination is that, by shifting additional high frequency regions of the spatial-frequency spectrum into the passband of the optical system, information normally inaccessible in a conventional wild-field microscope can be recovered in the reconstruction of image $M(x,y)$, thereby improving the spatial resolution of the optical system.

According to equation (3), the observed image $M(x,y)$ is now the sum of the ordinary image $M_0$ and four additional components whose spectra have been offset by +u or −u from their origins. As the coefficients by which these components are added together in equation (3) depend on the phase of the illumination (i.e., $\Delta\phi_x$ and $\Delta\phi_y$), these components can be extracted by recording a sequence of images of the specimen at different illumination phases and performing image arithmetic on the recording images. Once these components are separated, information in these components can be used to reconstruct an image of the specimen at an axial and lateral resolution greater than that of a conventional wide-field microscope, as described in greater detail below.

2 Operation

Figure 2:
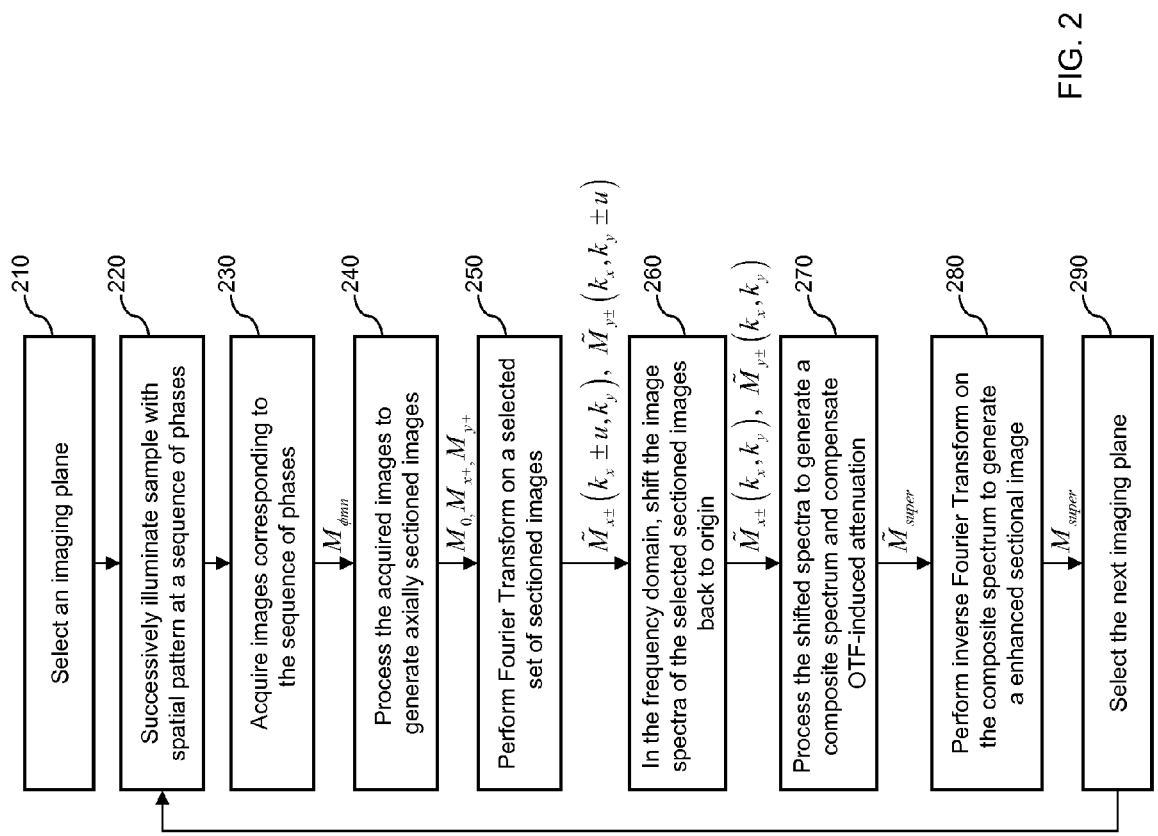
FIG. 2 is a flow chart of an imaging procedure for use with the optical sectioning microscope shown in FIG. 1.

Referring to FIG. 2, an exemplary procedure 200 is provided for use with the microscope 100 to perform optical sectioning of a 3D specimen. Using this procedure, axially sectioned images of the specimen can be obtained at a greater resolution in both lateral and axial directions than that of a conventional wide-field microscope.

STEP 210: An initial region of interest (ROI) is first identified for imaging. This ROI is typically defined by a two-dimensional (x- and y-) area at a selected z-depth of the specimen 160. Incident light beam can be focused onto the region by axially and laterally moving the specimen 160 relative to the objective 150, for example, by translating the positioning stage 162.

STEP 220: The specimen 160 is successively illuminated with a light pattern at each phase of a sequence of spatial phases. In this example, the light pattern is produced by directing the light beam 112 through the mask 130, and the spatial phases of the light pattern is adjusted by linearly translating the mask 130 along the $p_x$ and $p_y$ axes.

For example, referring to FIGS. 3A-3E, a 2D periodic light pattern is shown at a set of five spatial phases. In FIG. 3A, the light pattern is centered at the origin, with the line spacing repeating at a spatial period of $T_x$ and $T_y$ along the $p_x$ and $p_y$ axes, respectively. In this example, $T_x$ is configured to be the same as $T_y$. In some other examples, it is also possible to configure a 2D light pattern with a distinct local periodicity in each of the two directions.

In FIGS. 3B and 3C, the light pattern is shifted along the $p_x$ axis by 120° (or T/3) in the negative and positive directions, respectively. Similarly, in FIGS. 3D and 3D, the light pattern is now shifted along the $p_y$ axis by 120° (or T/3) in the negative and positive directions, respectively.

The spatial phase constants $\phi_{mn}$ for the five patterns shown in FIGS. 3A-3E can be denoted as $\phi_{mn} = (2\pi/3)\cdot(m,n)$, where $(m,n) = (0,0), (1,0), (2,0), (0,1),$ and $(0,2)$, respectively.

STEP 230: Under the structured illumination, five images of the ROI in the specimen 160 are successively acquired by the detector 170, each image being formed at a respective one of the five spatial phases of illumination shown above. According to equation (3), an image $M_{\phi mn}$ acquired at phase $\phi_{mn}$ can be expressed by:

$$M_{\phi mn}(x,y) = 2M_0(x,y) + M_{X-}(x,y)e^{-i2m\pi/3} + M_{X+}(x,y)e^{i2m\pi/3} + M_{Y-}(x,y)e^{-i2n\pi/3} M_{Y+}(x,y)e^{i2n\pi/3} \quad (4)$$

At this step, the lateral and axial resolutions of the acquired image $M_{\phi mn}$ are comparable to that of a conventional wide-field microscope.

STEP 240: The five acquired images $M_{\phi mn}$ are processed to form axially sectioned images in real space. More specifically, based on the specific phase constants used for illumination in this example, $M_0$ can be extracted from the five acquired images as:

$$M_0(x, y) = \frac{1}{6}\begin{bmatrix} M_{\phi 10}(x, y) + M_{\phi 20}(x, y) + \\ M_{\phi 01}(x, y) + M_{\phi 02}(x, y) - M_{\phi 00}(x, y) \end{bmatrix} \quad (5)$$

while axially sectioned images $M_{X\pm}$ and $M_{Y\pm}$ are obtained as:

$$M_{X\pm}(x, y) = \frac{1}{3}\begin{bmatrix} M_{\phi 00}(x, y) + M_{\phi 10}(x, y)e^{\mp i2\pi/3} + \\ M_{\phi 20}(x, y)e^{\pm i2\pi/3} \end{bmatrix} \quad (6)$$

$$M_{Y\pm}(x, y) = \frac{1}{3}\begin{bmatrix} M_{\phi 00}(x, y) + M_{\phi 01}(x, y)e^{\mp i2\pi/3} + \\ M_{\phi 02}(x, y)e^{\pm i2\pi/3} \end{bmatrix} \quad (7)$$

At this step, each of the four axially sectioned images $M_{X\pm}$ and $M_{Y\pm}$ provides a greater axial resolution than that of a conventional wide-field microscope, as described above and also by Neil, et al., in Method of obtaining optical sectioning by using structured light in a conventional microscope, published in *Optics Letters*, on Dec. 15, 1997, the disclosure of which is incorporated herein by reference.

STEP 250: To further improve the lateral resolution of the images of the specimen 160, the four axially sectioned images $M_{X\pm}$ and $M_{Y\pm}$ are translated into a spatial-frequency domain (reciprocal space) by 2D Fourier transform. Accordingly, the frequency spectra of $M_{X\pm}$ and $M_{Y\pm}$ are obtained as $\tilde{M}_{X\pm}(k_x \pm u, k_y)$ and $\tilde{M}_{Y\pm}(k_x, k_y \pm u)$, respectively.

STEP 260: In the spatial-frequency domain, the spectral images $\tilde{M}_{X\pm}(k_x \pm u, k_y)$ and $\tilde{M}_{Y\pm}(k_x, k_y \pm u)$ are shifted by a magnitude of u along the $k_x$ and $k_y$ to their original positions, producing four shifted spectral images $\tilde{M}_{X\pm}(k_x, k_y)$ and $\tilde{M}_{Y\pm}(k_x, k_y)$.

STEP 270: The four shifted spectral images are processed to form a composite spectrum $\tilde{M}_{super}$, for example, by "stitching" a respective portion of the shifted spectral images to construct a superimposed spectral image. Preferably, signal attenuation caused by the microscope's OTF is also compensated in the process of constructing the superimposed spectral image.

STEP 280: By performing inverse Fourier transform on the composite spectrum $\tilde{M}_{super}$, a super-resolution image $M_{super}$ of the ROI is reconstructed. With the spectral analysis at steps 250-280, the reconstructed image $M_{super}$ provides a greater lateral resolution than that of the axially sectioned images $M_{X\pm}$ and $M_{Y\pm}$. Thus, $M_{super}$ is sometimes also referred as an enhanced sectioned image, which has greater resolutions in both lateral and axial directions than that of a conventional wide-field microscope.

STEP 290: Once $M_{super}$ of the current ROI is obtained, the next ROI at a different z-depth of the specimen is selected, for example, by axially translating the specimen 160 by a predetermined increment/decrement. Accordingly, super-resolution images of the specimen at a set of z-depths can be successively formed by iteratively performing steps 220-280 at each z-depth.

In this example, optical sectioning of a 3D specimen is described in a serial fashion. More specifically, the image reconstruction step 280 at a selected depth of the specimen is completed before the illumination step 220 at the next depth begins. In other examples, image acquisition steps 220-230 and image analysis steps 240-280 can be handled independently in a parallel fashion. For example, groups of five images $M_{\phi mn}$ can be first acquired through a set of depths of the specimen without interruption, while spectral analysis of the acquired images can be performed at a later stage.

Referring now to FIGS. 4A-4F, the procedure 200 described above can be further illustrated below. For purposes of simplicity, the 2D light pattern of FIG. 3A is projected onto a flat surface for imaging.

Figure 4B:
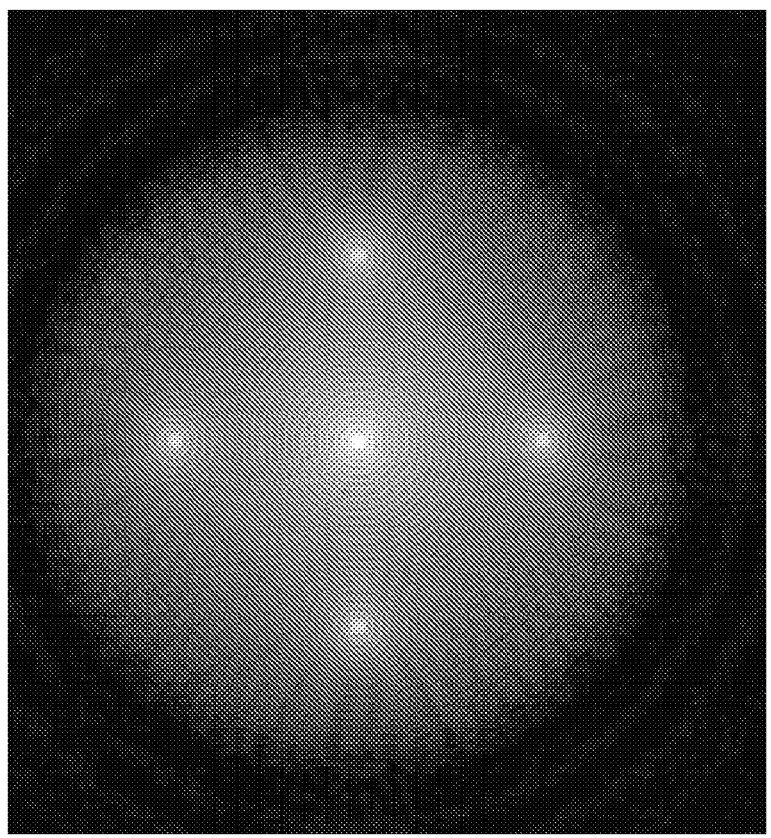
FIG. 4B is a spectral image of the two-dimensional periodic pattern by converting FIG. 4A to a spatial-frequency domain.
Figure 4A:
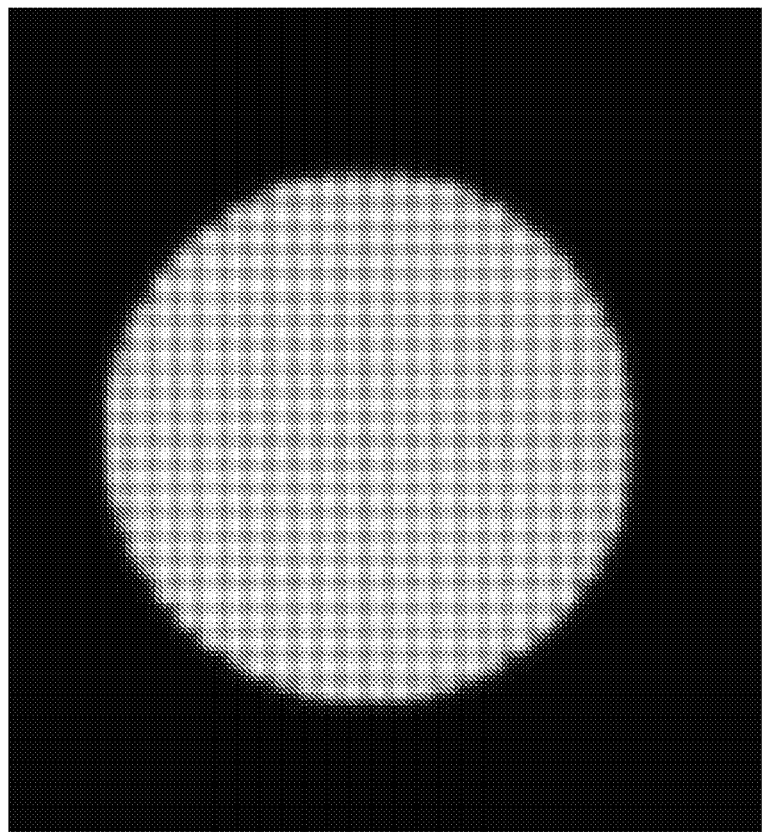
FIG. 4A is an optical image of the two-dimensional periodic pattern of FIG. 3A projected onto a flat surface.

FIG. 4A shows an image $M_{\phi 00}$ of the 2D light pattern of FIG. 3A being projected onto the flat surface (as obtained at step 230).

FIG. 4B shows a frequency spectrum $\tilde{M}_{\phi 00}$ of the image $M_{\phi 00}$ in the spatial-frequency domain by 2D Fourier transform. This spectrum contains an Airy pattern at the origin and four additional Airy patterns each offset from the origin by a distance along the $k_x$ and $k_y$ axes, respectively. This offset distance is proportional to the inverse line spacing of the light pattern of FIG. 3A.

Figure 4D:
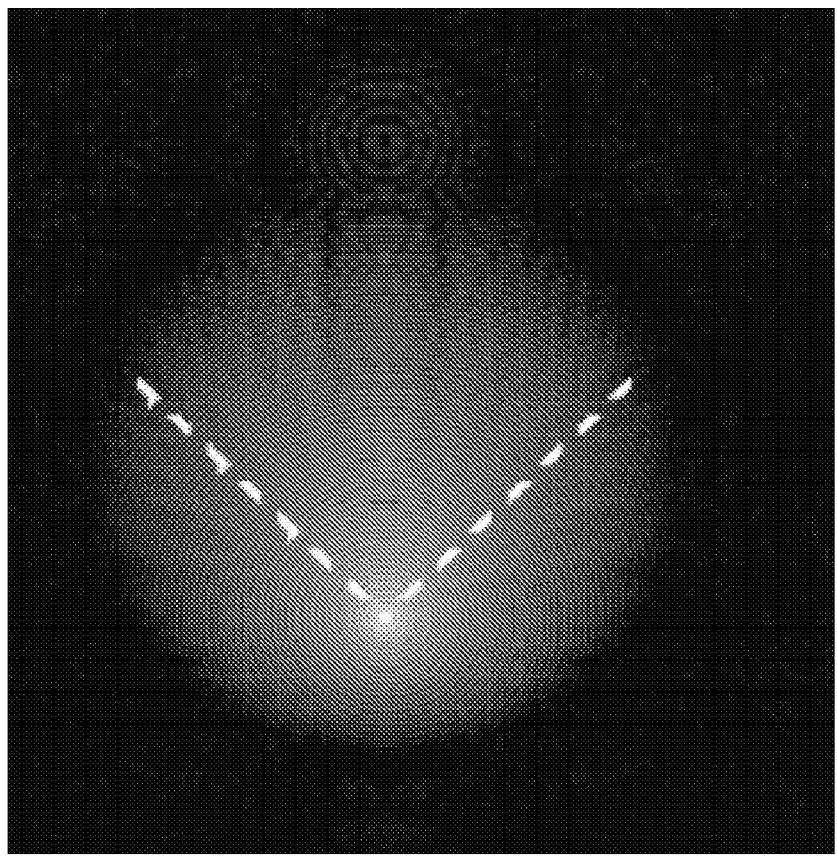
FIG. 4D is a spectral image $\tilde{M}_{x-}(k_{-u},k_y)$ of $M_{x-}$ in the spatial-frequency domain.
Figure 4C:
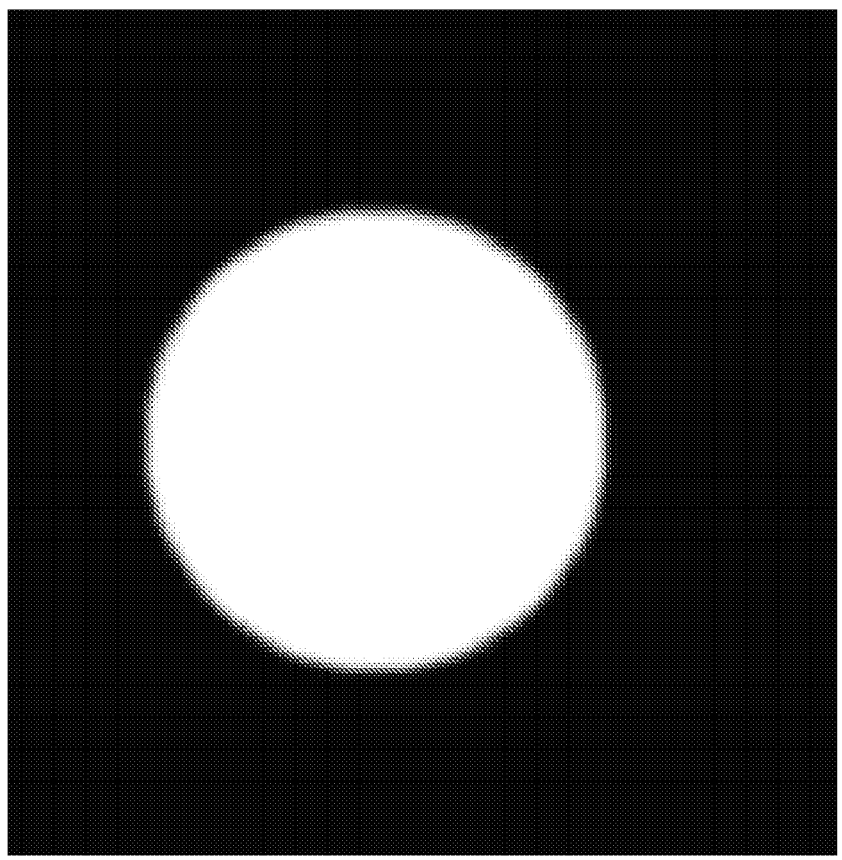
FIG. 4C is a sectioned image $M_{x-}$ of the two-dimensional periodic pattern of FIG. 3A.

FIG. 4C shows an axially sectioned image $M_{X-}$ of the 2D light pattern projected on the flat surface (as obtained at step 240).

FIG. 4D shows a spectral image $\tilde{M}_{X-}(k_{-u}, k_y)$ of $M_{X-}$ in the spatial-frequency domain (as obtained at step 250). In this spectral image, only the frequency components to the right of the two dashed lines are used to construct the composite spectrum $\tilde{M}_{super}$.

Figure 4E:
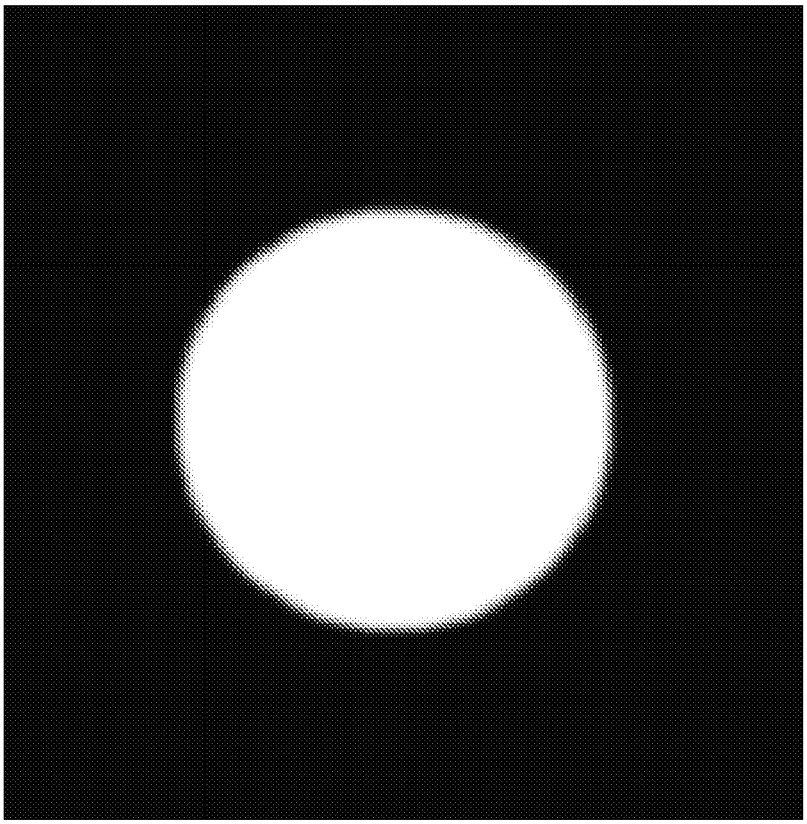
FIG. 4E is a composite spectral image $\tilde{M}_{super}$ generated by combining four shifted spectral images $\tilde{M}_{x\pm}(k_x,k_y)$ and $\tilde{M}_{y\pm}(k_x,k_y)$.

FIG. 4E shows the composite spectrum $\tilde{M}_{super}$ obtained by stitching respective portions of the four shifted spectral images $\tilde{M}_{Y\pm}(k_x, k_y)$ and $\tilde{M}_{X\pm}(k_x, k_y)$ into one spectrum (as obtained at step 270). The frequency components enclosed by the dashed lines of FIG. 4D forms a quarter of this composite spectrum $\tilde{M}_{super}$.

Figure 4F:
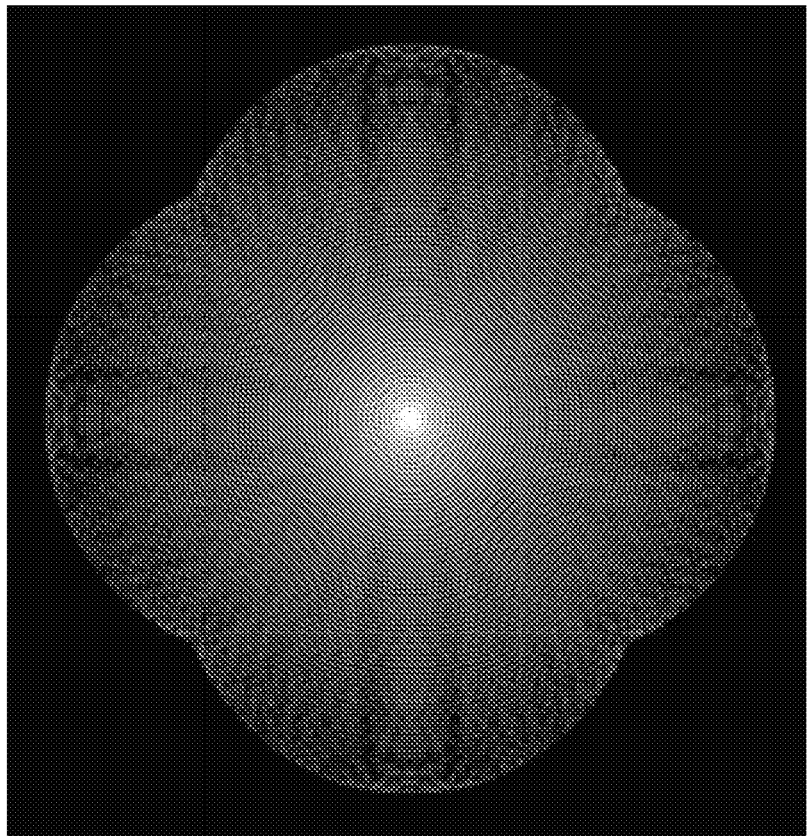
FIG. 4F is a reconstructed image $M_{super}$ of the two-dimensional periodic pattern projected onto the flat surface.

FIG. 4F is a reconstructed super-resolution image $M_{super}$ of the patterned image of FIG. 4A (not shown to the same scale).

3 Examples

The following sections provide some examples in which the system and procedures described above are used. In some examples, the results of structured illumination were compared with that of uniform illumination to illustrate the resolution-enhancing effect of structured illumination.

3.1 Example I

Figures 5A, 5B, 5C:
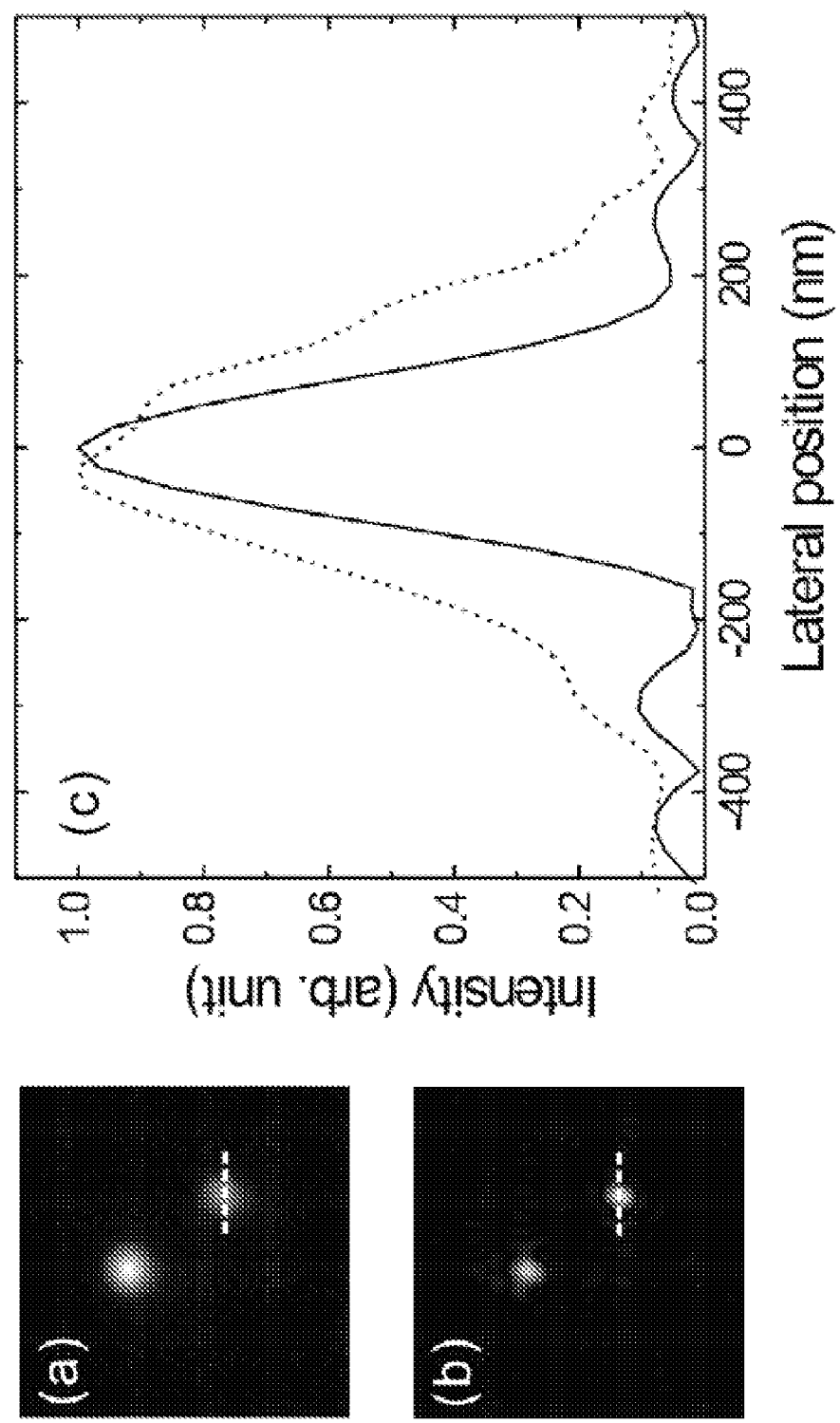
FIG. 5A is an image of two 100-nm fluorescent beads under uniform illumination.
FIG. 5B is a reconstructed super-resolution image of the two fluorescent beads under structured illumination using a 2D mesh pattern with a 750-nm period.
FIG. 5C is a plot of a first intensity profile (dashed curve) along the dashed line of FIG. 5A, and a second intensity profile (solid curve) along the dashed line in FIG. 5B.

Referring to FIGS. 5A-5C, a specimen containing fluorescent beads of 100-nm diameter was imaged using the optical sectioning microscope 100. The emission wavelength of these fluorescent beads was around 560 nm. At this emission wavelength, the theoretical lateral resolution limit with uniform illumination is around 263 nm. Therefore, the uniformly illuminated image of a 100-nm bead would have an observed width of nearly 280 nm. Here, the term "width" refers to the full width at half maximum (FWHM), assuming a Gaussian intensity distribution for individual particles in the image.

FIG. 5A shows an image of two 100-nm fluorescent beads under uniform illumination. FIG. 5B shows a super-resolution image of the two beads under structured illumination using a 2D pattern of a 750-nm period on the focal plane. FIG. 5C shows two intensity profiles of a selected bead, the dashed curve being sampled along the dashed line in FIG. 5A and the solid curve being sampled along the dashed line in FIG. 5B.

Based on the FWHM of the two intensity profiles in FIG. 5C, the lateral resolution of the uniformly illuminated image of FIG. 5A is about 325 nm. By comparison, the lateral resolution of the structurally illuminated image of FIG. 5B is around 180 nm (about 0.29λ), showing a resolution improvement by nearly a factor of 2.

3.2 Example II

Referring to FIGS. 6A-6C, three 200-nm fluorescent beads were scanned along the z-axis for estimating the axial resolution of the microscope 100 with structured illumination. The beads were selected to be larger in diameter than those in the first example in order to avoid the coupling between axial and lateral intensity variations, which typically occurs when objects being imaged are much smaller than the lateral resolution of the optical system.

Here, the axial intensity curves of two meshed patterns of different periods were measured and compared. In FIG. 6C, the dashed curve was obtained by projecting a mesh pattern of a 750 nm period (measured on the focal plane) to the specimen, while the solid curve was obtained by projecting a mesh pattern of a 500 nm period to the specimen. The FWHM of the solid curve is about 290 nm, corresponding to an axial resolution of 210 nm (about 0.38λ).

FIGS. 6A and 6B are images of the beads at two different axial positions using the 750-nm mesh pattern. These two images also show that the lateral resolution is improved such that three beads can be resolved clearly, and the intensity of the beads decreases as the specimen is moved away from the focal plane.

Note that the side lobes of the axial intensity curve obtained with the 500-nm mesh pattern are still at 20% of the peak intensity, which might be caused by the axial aberration of the objective. For stacked specimens, such side lobes may affect the image quality and therefore, in some examples, the 750-nm mesh pattern may be preferable for observing structures inside biological samples (e.g., cells). In some implementations, it is possible to reduce the magnitude of the side lobes by using certain filtering techniques (e.g., axial apodizing filters) in conjunction with the modulation patterns.

3.3 Example III

The optical sectioning microscope 100 and the procedures described above may be used in biological applications in which sub-cellular structures are observed, even when cells are stacked together.

Referring to FIGS. 7A-7E, fluorescent images of actin filaments (stained with Alexa Fluor 488 phalloidin) inside fixed fibroblast cells are obtained under various imaging conditions.

Figure 7A:
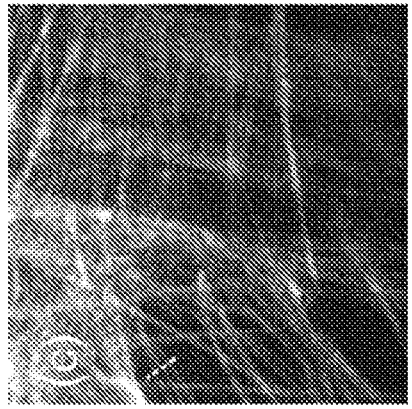
FIG. 7A is an image of actin filaments in a group of fibroblasts under uniform illumination with a 20× objective (NA=0.4).

FIG. 7A is an image of the actin filaments under uniform illumination. The image was obtained with a low magnification (20×) objective having a numerical aperture (NA) of 0.4. In this image, actin filaments in several overlapped cells are visualized.

Figure 7B:
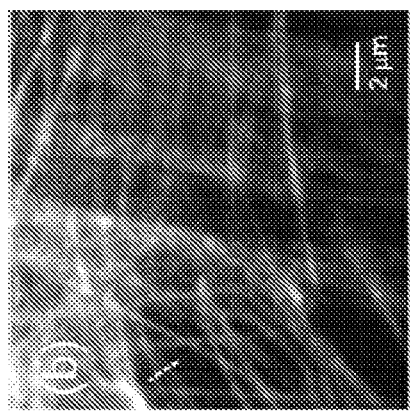
FIG. 7B is a detailed image of the area enclosed by the dashed square of FIG. 7A under uniform illumination with a 100× objective (NA=1.3).

FIG. 7B is a magnified image of a selected region (enclosed by the dashed square) of FIG. 7A, again, under uniform illumination. This image was obtained with a high magnification (100×) objective having a NA of 1.3.

Figure 7C:
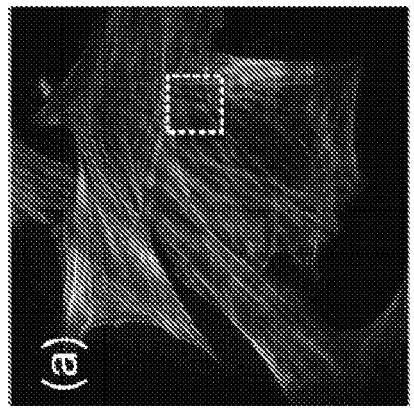
FIG. 7C is a detailed image of the same area as FIG. 7B under structured illumination with the 100× objective (NA=1.3).
Figure 7D:
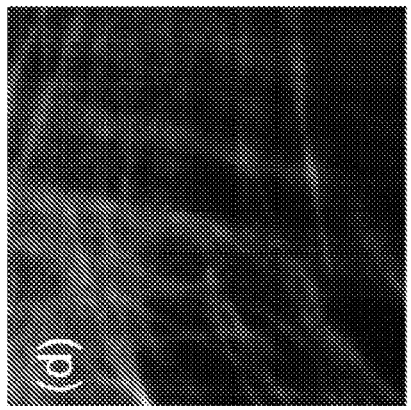
FIG. 7D is a detailed image of the same area as FIG. 7C under structured illumination with the 100× objective (NA=1.3) being axially shifted by 500-nm from its position in FIG. 7C.

FIG. 7C is an image of the same region as FIG. 7B but obtained under structured illumination, and FIG. 7D is an off-focus image of the same region of FIG. 7C after axially shifting the objective by 500 nm. The improved lateral resolution in FIG. 7C enables clear identification of several thin filaments that are smeared in FIG. 7B. Thus, cytoskeletons and/or other cellular organelles can be precisely quantified using this technique. Also, the lower intensity of FIG. 7D than that of FIG. 7C is consistent with the sectioning ability of this technique.

Figure 7E:
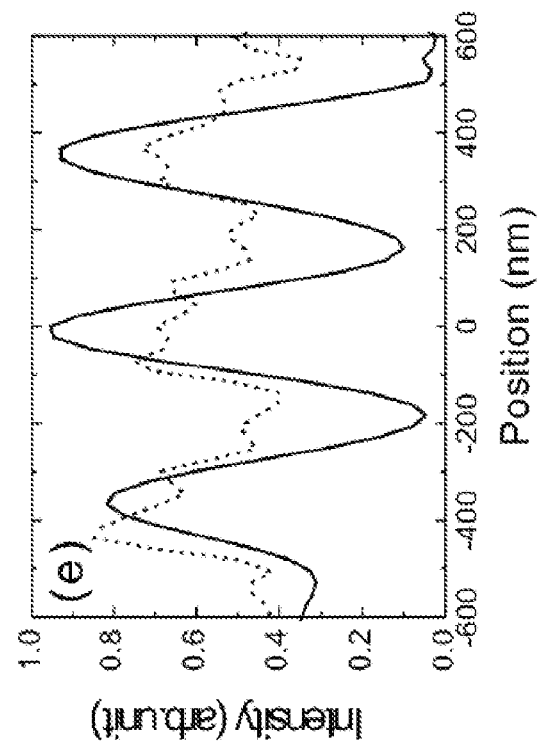
FIG. 7E is a plot of a first image intensity profile (dashed curve) along the dashed line of FIG. 7B, and a second image intensity profile (solid curve) along the dashed line of FIG. 4C.

FIG. 7E shows the line intensity profiles along the dashed lines of FIG. 7B (dashed intensity curve) and 7C (solid intensity curve). Based on the two profiles, the widths of the observed actin filaments are ~330 nm and ~200 nm, respectively, indicating that structured illumination is capable of revealing finer structure of a biological specimen than uniform illumination.

4 Alternative Embodiments

Various alternative embodiments of the system and methods described above are available.

Figure 8:
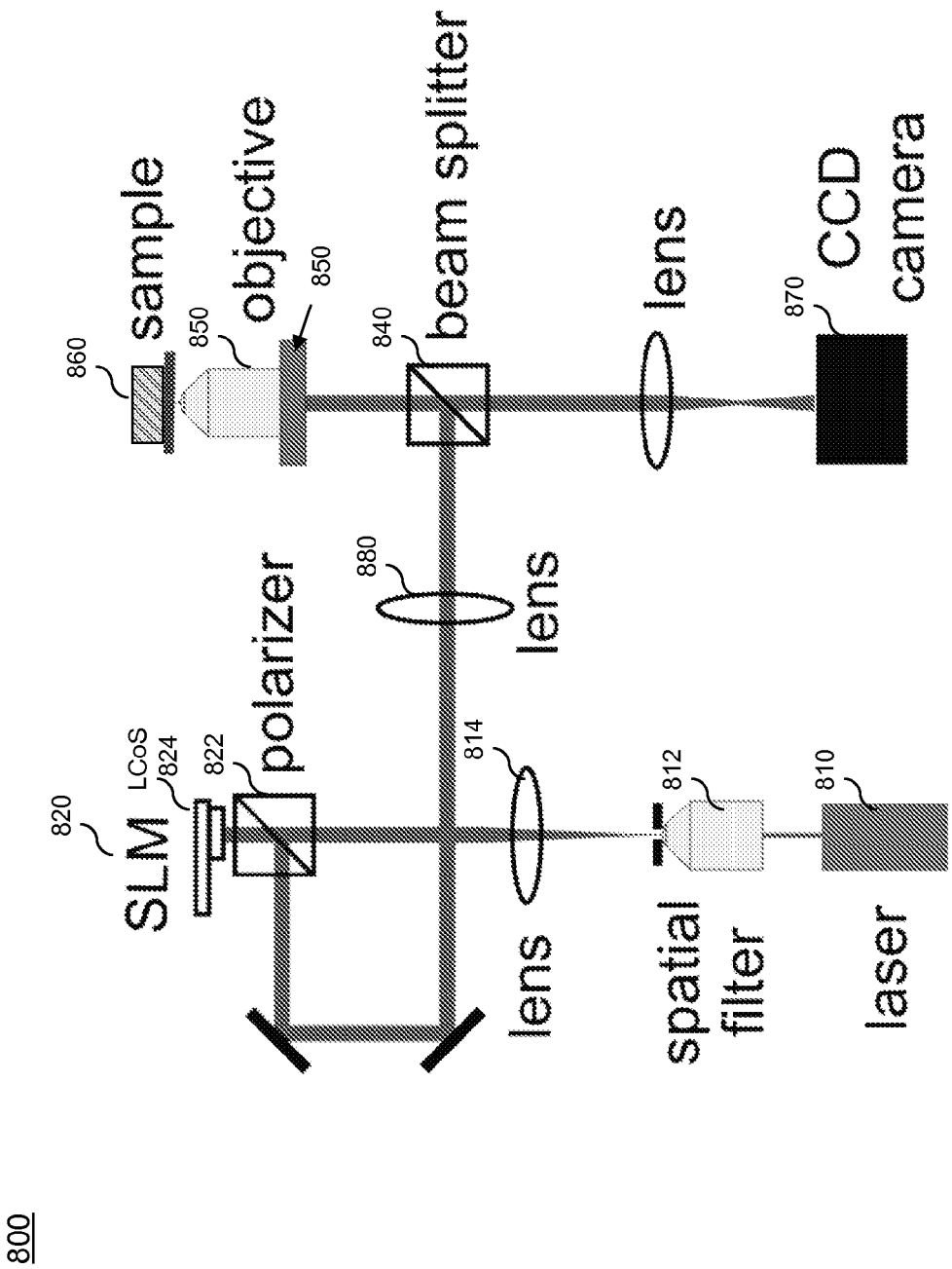
FIG. 8 is a schematic illustration of an alternative embodiment of the optical sectioning microscope shown in FIG. 1.
Figure 9C:
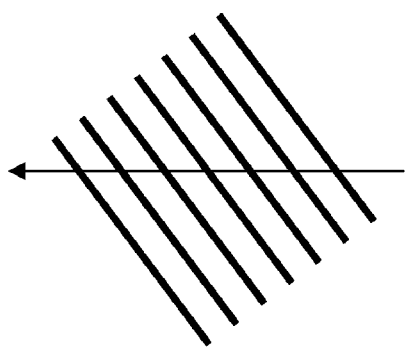
FIGS. 9A-9F are schematic illustrations of modulating an alternative one-dimensional periodic pattern at a sequence of phases according to the procedure of FIG. 2.
Figure 9F:
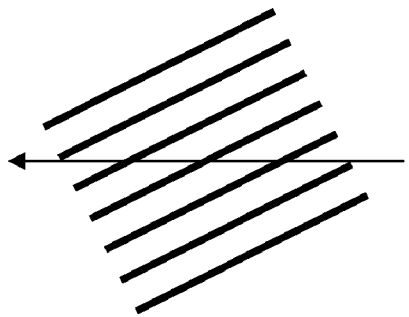
Figure 9B:
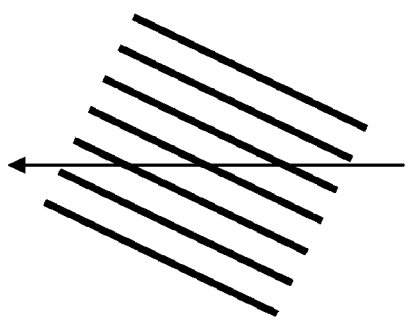
Figure 9E:
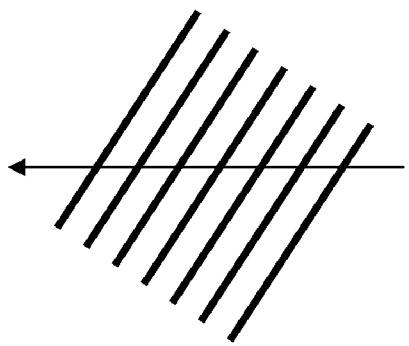
Figure 9A:
Figure 9D:
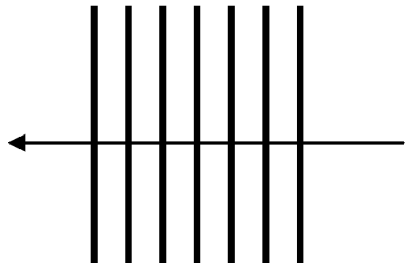

Referring to FIG. 8, an alternative embodiment of the optical sectioning microscope 800 is shown. In this embodiment, a spatial light modulator 820 includes a reflective liquid-crystal-on-silicon (LCoS) panel 824 coupled to a polarizer 822 for 2D modulation of the illumination light. The LCoS panel 824 consists of 1024×768 pixels with a pixel size of 11.3×11.3 μm². The 2D sinusoidal modulation pattern projected on a sample 860 can be shifted by rapidly varying a drive signal on the LCoS 824 at a frame-refresh rate as high as 60 Hz.

A light source 810 (e.g., a 50 mW, 475 nm diode-pumped solid-state laser) produces a light beam, which is passed through a spatial filter 812 and then expanded by a lens 814 to a diameter of ~8 mm (FWHM) for illuminating the SLM 820. The mesh pattern on the SLM 820 is then projected onto the sample 860 through a lens 880 and an objective 850 (e.g., an oil-immersion objective with a NA of 1.3). Images of the sample 860 are captured by a CCD camera 870. A piezoelectric transducer 852 (PZT) is coupled to the objective 650 to control the height of the focal plane relative to the sample 860.

Referring again to FIG. 1, other examples of the light source 110 suitable for use include various types of lamps (such as LED bulbs and xenon arc lamps) and lasers (such as single- and multiple-wavelength lasers). Light source 110 may also include a set of optical components such as lenses, mirrors, and filters (not shown) for controlling the characteristics (e.g., intensity, wavelength, and direction) of its outgoing light beam 112. Examples of the detector 170 include CCD cameras and other CMOS detectors.

In addition to using masks, light modulation can also be implemented by using patterns generated by the light source itself. For example, an LED array can be configured to have the ability to generate movable 2D mesh patterns.

Various forms of spatial patterns can be used. For example, one-dimensional sinusoidal pattern or two-dimensional sinusoidal pattern of symmetric or asymmetric periodicity may be used. Also, the spatial phase by which the light pattern is modulated can be conveniently changed.

Referring to FIGS. 9A-9F, one example of modulating the spatial phases of illumination using a 1D grid is shown. In this example, the 1D grid is rotated to a sequence of angular positions, each angular position corresponding to one of a sequence of spatial phases.

Alternative ways of generating spatial patterns are also possible. In some examples, the spatial patterns may be generated using laser speckle techniques. For instance, if a certain piece of ground glass or light diffuser is installed along the illumination light path, a fixed speckle pattern can be generated for illuminating the specimen. With the speckle pattern, in some cases, a greater number of frames may be processed in order to achieve one sectioned image with enhanced resolution.

Methods of operation and signal processing may be implemented in a computer program product tangibly embodied in a machine-readable storage device for execution by a programmable processor and method actions can be performed by a programmable processor executing a program of instructions to perform functions of the invention by operating on input data and generating output. One or more of the spatial light modulator, the detector, the light source, the processor, and other components of the system may be coupled to a controller implemented in one or more computer programs that are executable on a programmable system including at least one programmable processor coupled to receive data and instructions from, and to transmit data and instructions to, a data storage system, at least one input device, and at least one output device.

It is to be understood that the foregoing description is intended to illustrate and not to limit the scope of the invention, which is defined by the scope of the appended claims. Other embodiments are within the scope of the following claims.

What is claimed is:

1. A method for optical imaging comprising:
   successively illuminating a sample with a spatial pattern at each phase of a plurality of phases;
   acquiring data representing a first set of images of the sample at a first axial resolution and a first lateral resolution, each image being associated with a respective phase of the plurality of phases of the illumination; and
   processing the acquired data to generate an enhanced sectioned image of the sample, including:
      processing the acquired data to generate data representing a second set of images at a second axial resolution greater than the first axial resolution; and
      performing spectral analysis on the data representing the second set of images to form data representing the enhanced sectioned image of the sample at a second lateral resolution greater than the first lateral resolution.

2. The method of claim 1, wherein processing the acquired data to generate data representing the second set of images includes:
   arithmetically combining the first set of images to generate the second set of images according to the respective phase of the illumination associated with each of the first set of images.

3. The method of claim 1, wherein performing spectral analysis on the data representing the second set of images includes:
   for each image of a subset of the second set of images, conducting Fourier analysis to form a spectral representation of the image in a spatial-frequency domain.

4. The method of claim 3, wherein performing spectral analysis on the data representing the second set of images further includes:
   combining a respective portion of each of the spectral representations to form a composite spectral representation of the enhanced sectioned image of the sample.

5. The method of claim 4, wherein combining the respective portion of each of the spectral representations includes:
   shifting each of the spectral representations of the subset of the second set of image towards an origin of the frequency domain by a vector determined at least based on a physical characteristic of the spatial pattern.

6. The method of claim 5, wherein the physical characteristic of the spatial pattern includes a periodicity of the pattern.

7. The method of claim 4, wherein performing spectral analysis on the data representing the second set of images further includes:
   processing the composite spectral representation using inverse Fourier transform to generate the enhanced sectioned image.

8. The method of claim 1, wherein the spatial pattern exhibits periodicity in one spatial dimension.

9. The method of claim 1, wherein the spatial pattern exhibits spatial periodicity in two spatial dimensions.

10. The method of claim 1, wherein successively illuminating a sample with a spatial pattern at each of a plurality of phases includes:
    in a plane perpendicular to an axis of the illumination, translating the spatial pattern in a linear fashion to each of a sequence of positions determined based on a periodicity of the spatial pattern.

11. The method of claim 1, wherein successively illuminating a sample with a spatial pattern at each of a plurality of phases includes:
    in a plane perpendicular to an axis of the illumination, rotating the spatial pattern by each of a sequence of angles.

12. The method of claim 1, wherein successively illuminating a sample with a spatial pattern at each of a plurality of phases includes:
    focusing the illumination to a first depth of the sample for generating a sectioned image of the sample at the first depth.

13. The method of claim 12, further comprising:
    successively focusing the illumination to a series of depths of the sample for generating a series of sectional images of the sample each at a respective depth.

14. A system for optical imaging comprising:
    a light source for generating a light beam with a spatial pattern for successively illuminating a sample at each phase of a plurality of phases;
    a detector for detecting a first set of images of the sample at a first axial resolution and a first lateral resolution, each image being associated with a respective phase of the plurality of phases of the illumination; and
    a processor for processing the first set of images to generate an enhanced sectioned image of the sample, the processor being configured to:
       process the first set of images to generate data representing a second set of images at a second axial resolution greater than the first axial resolution; and
       perform spectral analysis on the data representing the second set of images to form data representing the enhanced sectioned image of the sample at a second lateral resolution greater than the first lateral resolution.

15. The system of claim 14, further comprising an optical component for focusing the light beam at a first depth of the sample.

16. The system of claim 15, further comprising a controller coupled to the optical component and configured to control the optical component for focusing the light beam at a second depth of the sample.

17. The system of claim 16, wherein the controller includes a piezo-electric positioner.

18. The system of claim 14, wherein the light source includes a mask having a first periodicity in a first spatial dimension.

19. The system of claim 18, wherein the mask further has a second periodicity in a second spatial dimension.

20. The system of claim 18, wherein the light source further includes a modulator coupled to the mask and configured for modulating the phase of the illumination by changing a configuration of the mask.

21. The system of claim 20, wherein the configuration of the mask includes a position of the mask.

22. The system of claim 20, wherein the configuration of the mask includes an orientation of the mask.

23. The system of claim 14, wherein the processor is further configured to:
- arithmetically combine the first set of images to generate the second set of images according to the respective phase of the illumination associated with each of the first set of images;
- for each image of a subset of the second set of images, conduct Fourier analysis to form a spectral representation of the image in a spatial-frequency domain;
- combine a respective portion of each of the spectral representations to form a composite spectral representation of the enhanced sectioned image of the sample; and
- process the composite spectral representation using inverse Fourier transform to generate the enhanced sectional image.

24. The system of claim 14, wherein the light source includes an LED array configured to generate movable light patterns.

* * * * *